June 29, 1965  L. R. ALLISON  3,192,382
AUTOMATIC VEHICLE CONTROL APPARATUS
Filed July 24, 1961
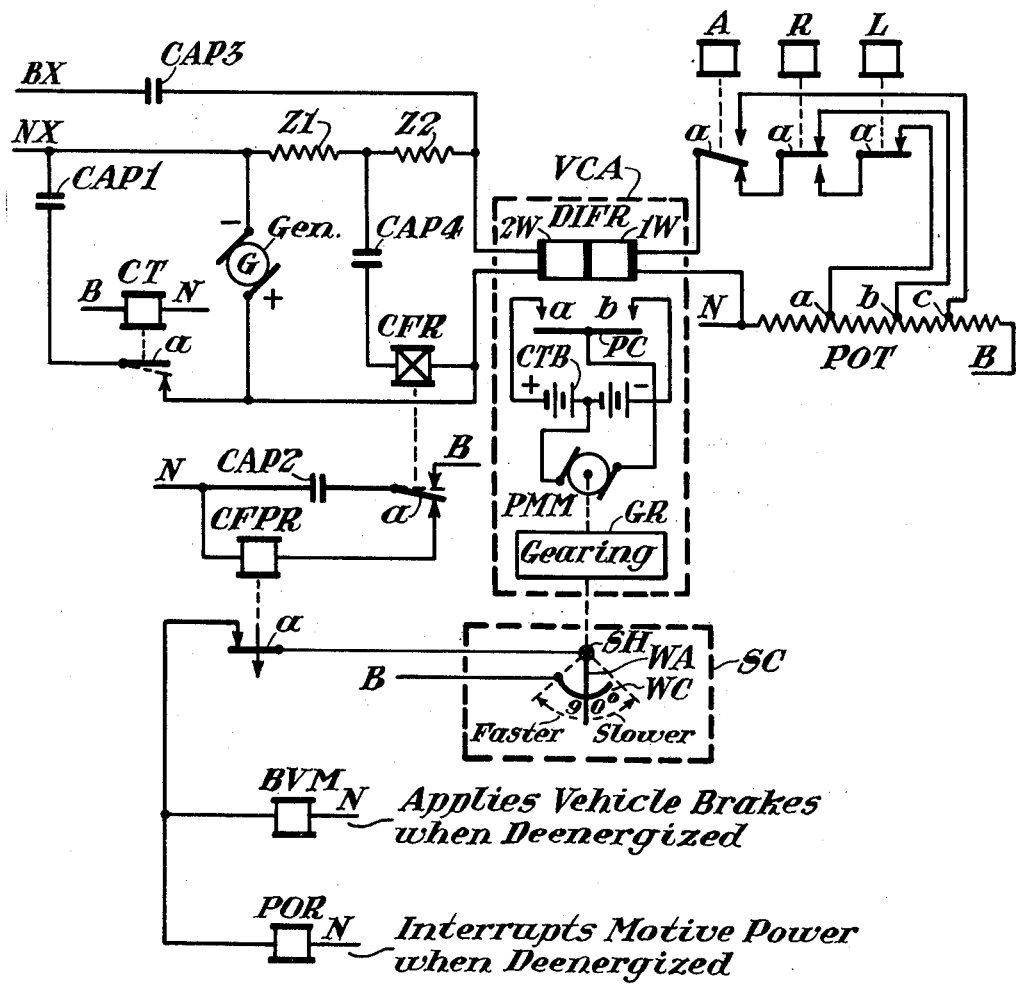
INVENTOR.
Leslie R. Allison
BY
W. L. Stout.
HIS ATTORNEY 3,192,382
AUTOMATIC VEHICLE CONTROL APPARATUS
Leslie R. Allison, Forest Hills, Pa., assignor to Westinghouse Air Brake Company, Wilmerding, Pa., a corporation of Pennsylvania
Filed July 24, 1961, Ser. No. 126,037
9 Claims. (Cl. 246—187)

My invention relates to automatic vehicle control apparatus and particularly to vehicle-carried apparatus for automatically maintaining the speed of a vehicle at or near a selected speed.

One object of my invention is to provide economical and simplified apparatus for governing the speed of a vehicle.

A second object of my invention is to provide speed governing apparatus which is self-checking insofar as possible.

A third object of my invention is to provide a self-checking vehicle speed governing system in which the supply of motive power to the motor or motors of the vehicle is interrupted and the brakes of the vehicle are applied when certain essential components of the system fail to function.

In accordance with my invention I provide voltage comparing apparatus which compares a desired speed reference voltage with a second voltage representing the actual speed of a vehicle, and which produces a mechanical output in accordance with such comparison, the mechanical output being supplied to a controller on the vehicle which adjusts the speed of the vehicle to a faster or slower rate according as such speed is below or above the desired speed represented by the reference voltage. I also provide a Wheatstone bridge circuit arrangement for checking that the apparatus for supplying the second voltage to the voltage comparing apparatus is intact, said checking arrangement operating to apply the vehicle brakes and interrupt the supply of motive power to the motor or motors of the vehicle if the second voltage supply apparatus becomes impaired. Otherwise, if such apparatus becomes impaired, the vehicle speed would be excessively increased since such impairment and resulting interruption of the supply of the second voltage would appear to the voltage comparing apparatus that the vehicle speed is below the desired speed and the speed controller would therefore be adjusted to increase the vehicle speed.

Other objects and characteristic features of my invention will become apparent as the description proceeds.

I shall describe one embodiment of my invention as employed in the automatic control of a railway locomotive and shall then point out the novel features thereof in claims. Although I have chosen, as an example of my invention, the control of a railway locomotive, it is to be understood that my invention may be readily applied to any vehicle of the automotive type and, furthermore, it is immaterial whether the source of the motive power for the vehicle is self-carried, or supplied from a source external to the vehicle as in electric railway systems.

The accompanying drawing is a diagrammatic view of vehicle control apparatus embodying my invention.

As outlined above, I have chosen, as an example of the apparatus of my invention, to describe its use in the control of a railway locomotive and, therefore, the apparatus shown in the drawing is to be considered as provided on such a vehicle.

There is shown in the upper right-hand section of the drawing, a series of three relays designated A, R and L which may be considered to be high, medium and low speed relays, respectively. The control arrangement for these relays is not shown in the drawing since it forms no part of my present invention but, for purposes of this description these relays may be considered to be controlled in the manner described for similar relays shown in FIG. 1 of Letters Patent of the United States No. 2,336,766, issued December 14, 1943, to Leslie R. Allison and Carl Volz for Railway Traffic Controlling Apparatus. It is sufficient for an understanding of my present invention to state that a relay A is energized when the speed of the locomotive provided with the apparatus of my invention is to be controlled within a high speed range, relay A is released and relay R is energized when said speed is to be controlled within a medium speed range, and only relay L is energized when said speed is to be controlled within a low speed range. It will be readily understood that relays A, R and L may be manually controlled to select a desired speed for a locomotive or other vehicle, or a manually operated circuit controlling device may be substituted for contacts a of relays A, R and L shown in the drawing, and the desired speed selected directly by manual operation of such devices. It is believed apparent, therefore, that the apparatus, such as relays A, R L, for selecting a desired speed, forms no part of my present invention, and such speed relays are shown merely to illustrate one example of the manner in which a desired vehicle speed may be selected.

A voltage comparing device or voltage comparator apparatus is employed in my invention for determining whether the actual speed of the locomotive is above or below the desired speed. This voltage comparator apparatus is shown in the drawing enclosed in a broken line block diagram designated VCA, and includes a differential relay DIFR, a permanent magnet motor PMM, a source of direct current comprising a split or center-tapped battery CTB, and a reduction gear arrangement GR.

Differential relay DIFR is provided with first and second control windings 1W and 2W, respectively, which control a three-position polar contact PC shown beneath the windings of the relay. Contact PC normally occupies its neutral position as shown in the drawing and is actuated to close against fixed contact points a or b in response to a differential energization of the windings 1W and 2W. That is, if winding 1W is energized by a voltage of a preselected value greater than a voltage supplied to winding 2W, contact PC will be actuated to close against its fixed contact point b. Similarly, if winding 2W is energized by a voltage of said preselected value greater than a voltage supplied to winding 1W, then contact PC will be actuated to close against its fixed contact point a. Such differential relays are well known in the art and for purposes of this description relay DIFR may be, but need not necessarily be, similar to the relay shown and described in Letters Patent of the United States No. 2,436,224, issued February 17, 1948, to Hugh M. Ogle for Differential Electromagnet Having Snap Action.

Motor PMM is shown in the drawing in the manner conventional for commutator type motors, and it will be readily understood that the armature of the motor rotates in first or second directions according to the polarity of electrical energy supplied to the brushes of the motor and, therefore, to the windings of the motor armature. One of the motor commutator brushes is connected to contact PC of relay DIFR and the other of said brushes connects to the center tap of split battery CTB. Fixed contact points a and b of contact PC of relay DIFR are connected to the positive and negative terminals, respectively, of center-tapped battery CTB. By this arrangement the armature of motor PMM is normally deenergized, but is energized to rotate in first or second directions according as said contact PC is actuated to close against its fixed contact point a or b. That is, the armature of motor PMM rotates in a first direction when winding 2W of relay DIFR is energized by a voltage of said predetermined value greater than that supplied to winding 1W of relay DIFR, and the armature rotates in a second direction when windings 1W and 2W are energized in the opposite manner.

The armature of motor PMM is indicated by a dotted line as being operatively connected to the reduction gearing arrangement GR, the output of which is, in turn, indicated by a dotted line as being operatively connected to a vehicle speed controller SC. By the arrangement shown it is apparent that any rotation of the armature of motor PMM is transferred through means of the reduction gearing to a shaft SH in speed controller SC, which shaft controls a wiper arm WA to move over a fixed wiper contact WC a predetermined degree in a clockwise or counter clockwise direction according to the direction of rotation of the motor armature. It is to be understood that the shaft SH of speed controller SC controls the supply of motive power to the motor or motors of the vehicle provided with the apparatus of my invention and, for example, may control the so-called accelerator of an automobile or similar vehicle, or as in the example I have chosen for an illustration of my invention, may control the so-called throttle of a locomotive. It is believed sufficient, for the purpose of this description, to point out that the speed of a vehicle provided with the apparatus of my invention is increased or decreased according as the speed controller shaft SH and, therefore, wiper arm WA is moved in the direction indicated as "faster" or "slower," respectively, by the dotted line arrows shown adjacent the tip of wiper arm WA.

Arm WA moves with a wiping action over the arc of a fixed wiper contact WC so that there is an electrical connection between arm WA and contact WC at all times except when arm WA is moved to its extreme counter clockwise position, it being understood that the arc through which arm WA is moved is approximately only 90 degrees, as shown in the drawing. The purpose of wiper arm WA and contact WC will become apparent later in this description.

While I have shown the voltage comparing apparatus VCA employed in my invention as comprising a differential relay and a permanent magnet motor for producing a mechanical output (shaft rotation) in accordance with the direction or polarity and the magnitude of the difference in the values of two voltages supplied to the separate windings on the differential relay, it is to be understood that such apparatus may comprise any one of a number of different voltage comparing means, and that my invention is not intended to be confined strictly to the voltage comparing means shown in the drawing.

It is expedient to point out at this time that a number of suitable sources of control current, other than the center-tapped battery source described above, are provided for the operation of the apparatus of my invention. The first of these sources is a direct current source, which may, for example, comprise a battery of proper voltage and capacity, and which for the sake of simplicity is not shown in the drawings. However, the positive and negative terminals of this battery are identified in the drawing by the reference characters B and N, respectively. Alternating current is also employed in my invention and may be provided from a commercial source of such current, or by a tuned alternator or similar device. However, this source of current is also not shown in the drawing but its terminals are arbitrarily designated BX and NX in respect with each other. A direct current generator designated GEN is employed to produce a direct current in proportion to the actual speed of the vehicle provided with the apparatus of my invention. This generator may conceivably be driven in a number of ways to produce a voltage representative of the speed of the vehicle, but is preferably operatively connected to an axle of the vehicle to preduce such voltage. The positive and negative output terminals of the generator are designated by plus (+) and minus (−) signs, respectively, in the conventional manner. The purpose of the generator will become more apparent as the description proceeds.

In addition to the relays and other apparatus described above, there is shown in the drawing a plurality of four additional relays designated CT, CFR, CFPR and POR, respectively; a plurality of four capacitors designated CAP1 through CAP4, a pair of first and second resistors designated Z1 and Z2, respectively; a potentiometer designated POT and having a plurality of taps on its resistive element, and a vehicle brake valve control magnet designated BVM.

Potentiometer POT controls a reference voltage to be supplied to the winding 1W of relay DIFR, such reference voltage representing the desired speed for a locomotive provided with the apparatus of my invention and such voltage being selected in accordance with the energized and deenergized condition of the previously discussed A, R and L relays. One terminal of potentiometer POT is connected to terminal N of the battery and a first side of winding 1W of relay DIFR. The other terminal of the potentiometer is connected to terminal B of the battery. As described below, the second side of winding 1W of relay DIFR is selectively connected over contacts of the A, R and L relays to the taps provided on the resistance element of the potentiometer.

Assuming that the speed of the locomotive is to be controlled to its high speed range, relay A is energized and connects winding 1W of relay DIFR to tap $c$ on the resistance element of the potentiometer. Thus, winding 1W is energized over a circuit which extends from battery terminal B through a first section of the resistance element of potentiometer POT to said tap $c$, the front point of contact $a$ of relay A, and through winding 1W of relay DIFR to terminal N of the battery. If the speed of the train is to be controlled to its medium speed range, relay A is released and relay R is energized and connects winding 1W of relay DIFR to tap $b$ on potentiometer POT. Thus, winding 1W is energized over a circuit extending from battery terminal B over first and second sections of the resistance element of potentiometer POT to said tap $b$, the front point of contact $a$ of relay R, the back point of contact $a$ of relay A, and through winding 1W of relay DIFR to battery terminal N. If the speed of the train is to be controlled to its low speed range, relays A and R are released and relay L is energized. The circuit for energizing the winding 1W of relay DIFR may then be traced from battery terminal B through first, second and third sections of the resistance element of potentiometer POT to tap $a$ and thence over front contact $a$ of relay L, the back point of contact $a$ of relay R, the back point of contact $a$ of relay A, and through winding 1W of relay DIFR to battery terminal N. It is therefore readily apparent that winding 1W of relay DIFR is energized by different values of voltage according to the speed range selected for the locomotive by the energized or deenergized condition of relays A, R and L, a higher value of voltage being supplied to winding 1W for each higher speed range desired. The utility of this arrangement will become apparent as this description proceeds.

Winding 2W of relay DIFR is connected so as to be energized from the output of axle-driven generator GEN previously mentioned. The circuit for so energizing winding 2W extends from the positive output terminal of generator GEN through winding 2W, and the previously mentioned resistors Z2 and Z1 connected in series, to the negative output terminal of generator GEN. It should be pointed out, for reasons which will become more apparent hereinafter, that resistors Z1 and Z2 are so selected that the product of the resistance of winding 2W and the resistance of resistor Z1 equals the product of the resistance of resistor Z2 and the internal resistance of generator GEN across its output terminals.

Relay CFR, previously mentioned, is an alternating current relay and has one side of its control winding connected through capacitor CAP4 to the junction point of series connected resistors Z1 and Z2. The other side of the control winding of relay CFR is connected to the previously mentioned circuit between the positive output terminal of generator GEN and said one side of winding 2W of relay DIFR. Capacitor CAP4 prevents direct current from generator GEN from flowing through the control winding of relay CFR.

Terminal BX of the previously mentioned alternating current source is connected through capacitor CAP3 to the end of resistor Z2 which is connected to winding 2W of relay DIFR. Terminal NX of the alternating current source is connected to the end of resistor Z1 which is connected to the negative output terminal of generator GEN. Capacitor CAP3 prevents direct current from generator GEN from intruding into the alternating current source.

It is readily apparent by referring to the drawing and from the description of the apparatus described in the last several preceding paragraphs that generator GEN, winding 2W of relay DIFR, resistors Z1 and Z2 and relay CFR are connected so as to form a normally balanced Wheatstone bridge circuit which is energized from the alternating current source. So long as this circuit remains balanced, relay CFR will, of course, remain released. However, relay CFR would also remain released if the connections to the control winding of that relay or to the alternating current source became open-circuited. Relay CFR would become steadily energized if one of the components of the circuit, for example the output terminals of generator GEN, became short-circuited, thereby unbalancing the bridge circuit. It may then be said that with the apparatus of the bridge circuit thus far described, relay CFR could be used to indicate that the components of the circuit are not short-circuited, since relay CFR would become picked up if such a fault occurs. However, if the connections to the control winding of relay CFR or to the alternating current source become open-circuited at the same time the bridge circuit becomes unbalanced relay CFR would remain in its position, that is released, and no indication of the unbalanced condition would be reflected. Accordingly, I have provided, as described below, a means for controlling relay CFR in such a manner that it checks both an open circuit condition and a short circuit condition of the apparatus.

The previously mentioned relay CT is a code transmitter or code generator relay which, when its control winding is energized, opens and closes its contacts at a predetermined code rate, as for example of 75 cycles per minute. As shown in the drawing I employ a contact $a$ of relay CT in a shunt circuit across the output terminals of generator GEN. This circuit may be traced from the positive output terminal of generator GEN over contact $a$ of relay CT, capacitor CAP1 and the negative output terminal of generator GEN to terminal NX of the alternating current source. The control winding of relay CT is continuously connected directly to terminals B and N of the battery and, therefore, the shunt circuit is normally being intermittently opened and closed at the 75 code rate. Capacitor CAP1 in the shunt circuit prevents the flow therethrough of the direct current from the output terminals of generator GEN. Code transmitter relays such as relay CT are well known in the art and for purposes of this description relay CT may be, but need not necessarily be, similar to the relay shown and described in Letters Patent of the United States No. 2,300,790, issued November 3, 1942, to Robert M. Laurenson for Electrical Relay.

As previously outlined, resistors Z1 and Z2 are selected so as to form a normally balanced Wheatstone bridge circuit. However, this otherwise normally balanced bridge circuit is intermittently unbalanced by the intermittent closing of contact $a$ of relay CT in its code generating operation. Thus, when contact $a$ of relay CT is open, relay CFR is deenergized because the alternating current flows only in the arms of the bridge circuit. When, however, contact $a$ of relay CT closes in its code generating operation, the arm of the bridge circuit comprising the internal resistance of generator GEN is short-circuited, the bridge circuit is unbalanced, and the alternating current flows through the winding of relay CFR which then becomes picked up. When contact $a$ of relay CT again opens, the bridge circuit is again balanced and relay CFR releases. It is apparent, therefore, that so long as the circuitry and components forming the bridge circuit are not faulty, relay CFR will follow the code pulses generated by relay CT. If, however, a short circuit or open circuit occurs in any of the circuitry of the bridge circuit or its components, including the connections to relay CFR and to the alternating current source, relay CFR will cease to follow the code pulses generated by relay CT and will remain steadily energized or steadily released depending on where the fault occurs and whether the fault is an open or a short circuit.

Contact $a$ of relay CFR controls a decoding arrangement, commonly termed "capacitor decoding" and employing capacitor CAP2 and the previously mentioned relay CFPR. When relay CFR is energized, capacitor CAP2 is charged over a circuit extending from battery terminal B over the front point of contact $a$ of relay CFR and through the capacitor to battery terminal N. When relay CFR is released, the energy previously stored in capacitor CAP2 is discharged through the winding of relay CFPR over the back point of contact $a$ of relay CFR. Relay CFPR is provided with a slow release feature so that the armature and the contacts of the relay will bridge the open periods of the back point of contact $a$ of relay CFR in its code following operation. This slow release feature is indicated in the drawing by the arrow drawn vertically through the movable part of contact $a$ of relay CFPR and pointed in the downward direction, that is, the direction in which the relay is slow acting. Thus, relay CFPR becomes picked up and closes its front contact $a$, and remains picked up so long as relay CFR is following the code pulses generated by relay CT or, in other words, so long as the Wheatstone bridge circuitry and components are not faulty.

Brake valve magnet BVM, previously mentioned, controls the release and application of the train brakes. That is, the valve releases the train brakes when energized and, when deenergized applies the train brakes as noted on the drawing. Magnet BVM has a control circuit which extends from battery terminal B over the wiper contact WC and wiper arm WA of speed controller SC, front contact $a$ of relay CFPR and through the winding of magnet BVM to battery terminal N. The train brakes are, therefore, released whenever the wiper arm WA of speed controller SC is in any position other than the stop (extreme counterclockwise) position and relay CFPR is picked up.

The previously mentioned relay POR is controlled by the identical circuit controlling valve magnet BVM and, therefore, this relay is normally energized but becomes deenergized whenever wiper arm WA of speed controller SC is in the extreme counterclockwise position or whenever relay CFPR is released. As noted on the drawing relay POR when deenergized interrupts the motive power, meaning, of course, the motive power to the motor or motors of the locomotive or other vehicle provided with the apparatus of my invention. Such interruption of motive power facilitates, of course, the braking of the vehicle as is readily apparent. The manner in which relay POR controls the supply of motive power to the motor or motors is immaterial to my invention, and it will be readily understood that if the motive power is electric current, relay POR can actuate a circuit breaker to interrupt such current. Similarly, if steam or gasoline is employed to provide motive power, relay POR can actuate a valve or similar device to cut off the source of supply of steam or gasoline to the motor or motors of the locomotive or other vehicle.

Before discussing an operational example of the apparatus of my invention, it is believed that it will be expedient to set forth, as an example only, some assumed speed ranges and values of voltage for the operation of the voltage comparing apparatus VCA. It will, therefore, first be assumed that the source of direct current whose terminals are designated B and N is, as an example only, a 30-volt battery.

Relays L, R and A will be assumed to represent arbitrarily selected speed ranges of from 7 to 11 m.p.h., 15 to 19 m.p.h. and 23 to 27 m.p.h., respectively. These speed ranges will be assumed to be represented by values of voltages from the battery of 9 volts, 17 volts and 25 volts, respectively. It will be further assumed that generator GEN is so constructed and geared to the axle of the locomotive that it generates a voltage of sufficient value that it supplies through the resistance of the bridge circuit to winding 2W of relay DIFR a voltage of 7 volts when the vehicle travels at 7 m.p.h. and a voltage of 27 volts when the vehicle is traveling at 27 m.p.h., and that such supply from the generator to winding 2W increases or decreases 1 volt with each increase or decrease, respectively, of 1 m.p.h. in the speed of the vehicle. Relay DIFR will be assumed to actuate its armature in accordance with a differential energization of its relay windings greater than 2 volts. That is, if winding 1W of relay DIFR is energized by a voltage more than 2 volts greater than that supplied to winding 2W, contact PC of the relay will be actuated to its closed position against its fixed contact point $b$, and if winding 2W is energized by a voltage more than 2 volts greater than that supplied to winding 1W, contact PC of relay DIFR will be actuated to its closed position against its fixed contact point $a$.

The apparatus may be assumed to be shown in the drawing under the conditions existing when the locomotive provided with the apparatus of my invention is moving within its medium speed range of from 15 to 19 m.p.h. along a stretch of level railway track. Under such conditions relay A is released and relay R is energized to control the speed of the locomotive to its medium speed range. That is, winding 1W of relay DIFR is connected to tap $b$ on potentiometer POT and, due to the voltage drop across the sections of the potentiometer thus selected, energy at a potential of 17 volts is supplied to winding 1W from the 30-volt battery. Generator GEN is being driven at a speed to supply direct current, at a voltage of from 15 to 19 volts depending on the actual speed of the locomotive, to winding 2W of relay DIFR. Since the voltage differential supplied to the windings of relay DIFR does not exceed 2 volts, contact points $a$ and $b$ of the relay are both open and motor PMM is not energized. Shaft SH and wiper arm WA of speed controller SC have both been controlled approximately to their middle positions, as shown, and it will be readily understood that shaft SH of the speed controller SC has adjusted the locomotive throttle (not shown) to provide sufficient motive power to the motor or motors of the locomotive to maintain the speed of the locomtive within its medium speed range.

Relay CT is intermittently opening and closing, at the 75 code rate, the shunt circuit across the output terminals of generator GEN; and the Wheatstone bridge circuit, energized from the alternating current source, is being intermittently controlled, at the 75 code rate, between balanced and unbalanced conditions. Relay CFR becomes picked up and released in accordance with the unbalanced and balanced conditions, respectively, of the bridge circuit, and contact $a$ of relay CFR is, therefore, following code pulses at the 75 code rate. The coding action of contact $a$ of relay CFR intermittently charges capacitor CAP2 and discharges it through the control winding of relay CFPR, and that relay is thereby controlled to close its front contact $a$ and, due to its slow release feature, to maintain such contact closed. Brake valve magnet BVM and relay POR are energized over their previously described common control circuit, and the locomotive or train brakes are released and a supply of motive power to be controlled by the locomotive throttle is maintained.

It will now be assumed that the locomotive moves onto an upgrade section of railway track and its speed and, therefore, the output from generator GEN decrease below 15 m.p.h. and 15 volts, respectively. The input to winding 1W of relay DIFR now being more than 2 volts in excess of the input to winding 2W of the relay, contact PC is actuated to close against its fixed contact point $b$, and motor PMM is thereby energized from center-tapped battery CTB by a polarity to drive the motor in a direction to rotate the shaft SH and wiper arm WA of controller SC in a clockwise direction. Such rotation of the shaft SH of controller SC adjusts the locomotive throttle to increase the motive power supplied to the motor or motors of the locomotive. This rotation of the shaft SH and wiper arm WA will continue until they are moved to their extreme clockwise limits, or until the speed of the locomotive is again increased to 15 m.p.h. and the differential of the voltages supplied to windings 1W and 2W of relay DIFR is again two volts or less. When this voltage differential is reached, contact PC of relay DIFR will open its contact $b$, motor PMM will be deenergized and the adjustment of speed controller SC will be terminated. The wiper arm WA and shaft SH will then remain in the position which they had reached when motor PMM became deenergized. Thus, the motive power to the motor or motors of the locomotive will be maintained at a degree necessary to maintain the speed of the locomotive within its medium speed range in its movement over the upgrade section of track.

It will now be assumed that the locomotive passes the crest of the upgrade section of track and moves into a downgrade track section. If the grade percentage of the downgrade section is sufficiently great, the speed of the train will increase until it exceeds 19 m.p.h., at which time generator GEN will supply energy in excess of 19 volts to winding 2W of relay DIFR. The input to winding 2W now being more than 2 volts in excess of the input to winding 1W of relay DIFR, contact PC of the relay is actuated to close against its fixed contact point $a$, and motor PMM is thereby energized from center-tapped battery CTB by a polarity to drive the motor in a direction to rotate the shaft SH and wiper arm WA of controller SC in a counterclockwise direction. Such rotation of the shaft SH reduces the supply of motive power to the motor or motors of the locomotive and, if the speed of the locomotive is not sufficiently reduced by such reduction of motive power, wiper arm WA will finally be moved to its extreme counterclockwise position. Such movement of wiper arm WA interrupts the physical contact between the arm and wiper contact WC and opens the circuit to brake valve magnet BVM and relay POR. The deenergization of magnet valve BVM applies the brakes of the locomotive to the train, and the deenergization of relay POR cuts off the locomotive motive power supply. The speed of the locomotive is thereby further decreased until reduced to 19 m.p.h. or less. At such time the output from generator GEN is sufficiently reduced that the voltage differential supplied to windings 2W and 1W of relay DIFR is 2 volts or less, and contact PC of the relay opens its contact $a$ and deenergizes motor PMM.

If and when the interruption of motive power and the application of the brakes reduces the speed of the locomotive to below 15 m.p.h., contact PC of relay DIFR is actuated to its closed position against its contact $b$, in the manner identical to that described for the upgrade train movement, and shaft SH and wiper arm WA are moved in their clockwise direction. When arm WA and wiper contact WC again come into physical contact, the circuit for energization of brake valve magnet BVM and relay POR is again closed, and the brakes are released and the cutoff of the motive power is terminated. When the speed of the locomotive again exceeds 15 m.p.h., motor PMM is deenergized in the manner previously described and the movement of shaft SH and wiper arm WA is terminated. Thereafter, any increase in the speed of the locomotive to above 19 m.p.h. again causes a power reduction and, if such reduction is not sufficiently effective, another brake application and interruption of motive power will subsequently result. These cycles of operation of the apparatus will continue to maintain the speed of the locomotive within allowable limits while moving on the downgrade track section.

If the speed of the locomotive is to be controlled to its high speed range, relay A is energized and connects winding 1W of relay DIFR to tap $c$ of potentiometer POT. Due to the voltage drop across the section of the potentiometer thus selected, energy at a potential of 25 volts is now supplied to winding 1W of relay DIFR from the 30-volt battery. Such energization of winding 1W will cause the speed of the locomotive to increase to its high speed range since speed controller SC is again actuated by motor PMM to increase the locomotive speed. However as soon as the speed of the train reaches or exceeds 23 m.p.h. the windings of relay DIFR are energized by a differential of 2 volts or less and motor PMM is deenergized, and further adjustment at this time of speed controller SC is terminated. It will be readily understood that the apparatus will thereafter operate in a manner similar to that described for the medium speed range, to maintain the speed of the locomotive, insofar as possible, within the high speed range.

If the speed of the locomotive is to be controlled to its low speed range, relays A and R are released and relay L is energized, and winding 1W of relay DIFR is connected to tap $a$ of potentiometer POT. Due to the voltage drop across the section of the potentiometer then selected, energy at a potential of 9 volts is now supplied to winding 1W of relay DIFR. The differential energization of windings 1W and 2W will now operate to control speed controller SC to reduce the locomotive speed and, if not reduced in sufficient time, a brake application and motive power interruption will result to further reduce such speed. Thereafter, the apparatus will operate in a manner similar to that previously described for the medium speed range, to control the speed of the train, insofar as possible, within the low speed range.

Having thus far described the operation of the apparatus of my invention under normal operating conditions, the purpose of the Wheatstone bridge arrangement will be briefly pointed out. For the purpose of this part of the description it will be temporarily assumed that the Wheatstone bridge arrangement is not provided and the output from generator GEN is directly connected to winding 2W of relay DIFR; it, therefore, being understood that relays CT, CFR, and CFPR are not employed, and that brake valve magnet BVM and relay POR are connected to battery terminal B over wiper arm WA and wiper contact WC only. If, under these conditions, a short circuit occurs across the output terminals of generator GEN, or one or more of the connections from said output terminals to winding 2W of relay DIFR become open-circuited, it would continuously appear to relay DIFR, since no energy is then supplied to its winding 2W, that the speed of the locomotive is continuously below the selected speed range. Under these conditions the shaft SH and wiper arm WA of speed controller SC would be controlled to their full clockwise positions, and full motive power would be continuously supplied to the motor or motors of the locomotive, regardless of the speed which the locomotive attains.

By utilizing the Wheatstone bridge circuit arrangement shown in the drawing and previously described, my invention provides protection against the above described faults that could occur in the circuitry or apparatus. For example, if a short circuit occurs across the output terminals of the generator GEN or winding 2W of relay DIFR becomes short-circuited, or if the connection from the negative output terminal of generator GEN to resistor Z1 becomes open, the Wheatstone bridge circuit becomes unbalanced and relay CFR ceases its code following operation and becomes steadily energized. Relay CFPR is released under these conditions and opens the control circuit to brake valve magnet BVM and relay POR which, in turn, apply the locomotive brakes and interrupt the motive power, respectively. In addition, components CT, CFR, CFPR, resistors Z1 and Z2, and the connections of the alternating current source to the Wheatstone bridge circuit, all such components being added to the basic circuit to provide the checking arrangement employed in my invention, are self-checking. For example, if resistor Z1 becomes open-circuited or if the connection from terminal B of the battery to the control winding of relay CT becomes open, the Wheatstone bridge also then becomes unbalanced, and relay CFR will become steadily energized and a brake application and motive power interruption will again result. For a further example of the self-checking feature, if the connections of the alternating current source to the bridge circuit become open or the alternating current source itself fails, or if a connection to relay CFR becomes open, relay CFR will release and remain released. Relay CFPR will subsequently also release and open the control circuits to brake valve control magnet BVM and relay POR.

From the foregoing description it is apparent that with the apparatus of my invention as shown in the drawing of this application, automatic vehicle speed control apparatus is provided which includes checking features necessary for safe operation of a vehicle by such apparatus.

While I have shown and described only one form of apparatus embodying my invention, it should be understood that various changes and modifications may be made therein within the scope of the appended claims without departing from the spirit and scope of my invention.

Having thus described my invention, what I claim is:

1. In a control apparatus for a vehicle having a source of motive power and brakes comprising, a sped controlling device adjustable through a range of positions for controlling the speed of the vehicle; voltage comparing apparatus comprising first and second direct current windings and having a mechanical output in accordance with the polarity and magnitude of the difference between first and second voltages supplied to said first and second windings, respectively, said mechanical output being connected to adjust said speed controlling device; a first direct current source, a potentiometer connected across the terminals of said source for selectively supplying to said first winding at different times each of a plurality of values of voltage each voltage representing a desired vehicle speed, a direct current axle driven generator on said vehicle for generating a voltage representing the actual speed of the vehicle, a source of alternating current, an alternating current relay; first and second resistors, the product of the resistance of the first resistor and the internal resistance of said generator equaling the product of the resistance of said second resistor and the resistance of said second winding, all of such resistances being connected to form a balanced Wheatstone bridge; a first capacitor, a first circuit connecting said alternating current source through said capacitor across first opposite junction points of the arms of said bridge, a second capacitor, a second circuit connecting through said second capacitor the winding of said alternating current relay across second opposite junction points of the arms of said bridge, a third capacitor, a third circuit intermittently shunting at a selected code rate through said third capacitor one arm of said bridge, and means responsive only to the energization and deenergization of said alternating current relay at said selected code rate for releasing said brakes and for maintaining motive power to said vehicle.

2. In an automatic control apparatus for a vehicle having a source of motive power and brakes comprising, a speed controller for adjusting the supply of motive power to said vehicle; a direct current voltage comparator comprising first and second windings and producing a mechanical output representative of the magnitude and the direction of the difference between first and second values of voltage supplied to the first and second windings, respectively, said mechanical output being supplied to said speed controller; means for supplying a direct current desired speed reference voltage to the first winding of said comparator; a direct current generator producing at its output terminals a voltage representative of the actual speed of said vehicle; first and second resistors so selected that the product of the internal resistance of said generator across the output terminals thereof and the resistance of the first resistor equals the product of the resistance of the second winding of said comparator and the resistance of the second resistor, said resistors, generator and second winding of said comparator being connected so as to form a balanced Wheatstone bridge; a source of alternating current connected across first opposite junctions of the arms of said bridge, an alternating current relay connected across second opposite junctions of the arms of said bridge, circuit means for intermittently shunting around one arm of said bridge said alternating current only at a selected code rate, and means responsive only to the intermittent operation of said alternating current relay at said selected code rate for maintaining the brakes of said vehicle released and supplying motive power to be adjusted by said speed controller.

3. In an automatic control apparatus for a vehicle having a source of motive power and brakes comprising a speed controller for adjusting the supply of motive power to the motors of said vehicle; electrically controlled voltage comparing apparatus having first and second windings and producing a mechanical shaft output representative of the difference between first and second electrical potentials supplied to said first and second windings respectively, said shaft output being supplied to said speed controller; a first source of electrical potential, means for supplying from said source to said first winding a reference potential representative of a desired vehicle speed, a second source of electrical potential comprising a generator producing at its output terminals a second potential representative of the actual speed of said vehicle, a balanced Wheatstone bridge circuit including in one arm of the circuit the internal resistance of said generator across said output terminals thereof and in an arm of the circuit adjacent said one arm the resistance of said second winding, a third source of electrical potential connected across a first set of opposite junctions of the arms of said bridge circuit, a first relay having a winding responsive only to electrical energy from said third source of potential and connected across the second set of opposite junctions of the arms of said bridge circuit; a shunt circuit for intermittently unbalancing said bridge circuit, said shunt circuit including means for blocking the passage of energy from said generator, a second relay, means responsive only to the intermittent operation of said first relay for maintaining said second relay picked up, and means controlled by said second relay for applying the brakes of said vehicle and interrupting the supply of motive power to the motors of said vehicle when the second relay is released.

4. In an automatic control apparatus for a vehicle having a source of motive power and brakes comprising, a speed controller adjustable through a range of positions for controlling the speed of said vehicle; means including first and second windings, and responsive to the comparison of first and second voltages supplied thereto, for producing a mechanical output representative of the direction and magnitude of the differences of said voltages, said mechanical output being connected to adjust said controller; a circuit for supplying to the first winding of said mechanical output producing means a value of first voltage representing a desired vehicle speed; means having first and second output terminals, and responsive to the actual speed of said vehicle, for producing a value of second voltage representing such actual speed; a balanced Wheatstone bridge circuit, including first and second resistors, for supplying the output from the output terminals of the second voltage producing means to said second winding of the mechanical output producing means, said resistors forming first adjacent arms of said bridge, and the resistance of said second winding and the resistance between said output terminals of the second voltage producing means forming second adjacent arms of the bridge; and means controlled by said Wheatstone bridge circuit for maintaining the brakes of said vehicle released and a supply of motive power to said vehicle so long as said Wheatstone bridge circuit remains intact.

5. In a control apparatus for a vehicle having a source of motive power and brakes comprising, an adjustable speed controller for controlling the speed of said vehicle; means including first and second windings, and responsive to the comparison of first and second voltages supplied thereto, for producing a mechanical output representative of the direction and magnitude of the differences of said voltages, said mechanical output being connected to adjust said controller; a circuit for supplying to the first winding of said means a first value of voltage representing a desired vehicle speed; means having first and second output terminals, and responsive to the actual speed of said vehicle, for producing a second value of voltage representing such actual speed; a balanced Wheatstone bridge, including first and second resistors, for supplying the output from the output terminals of the second voltage producing means to said second winding of the mechanical output producing means, said resistors forming first adjacent arms of said bridge, and the resistance of said second winding and the resistance between said output terminals forming second adjacent arms of the bridge; a source of alternating current connected across first opposite junctions of the arms of said bridge, an alternating current relay having its winding connected across second opposite junctions of the arms of said bridge, a circuit intermittently closed at a predetermined code rate and connected for shunting alternating current only around one arm of said bridge, and means controlled by said relay for applying the brakes of said vehicle and interrupting the motive power of the vehicle when intermittent operation of a contact of the relay at said predetermined code rate is interrupted.

6. A supply circuit for supplying current of a first character from a generator across a control winding responsive only to such current and apparatus for checking that such circuit is intact, said contact and apparatus comprising; first and second resistors so selected that the product of the resistance of the first resistor and the resistance of said control winding equals the product of the resistance of the second resistor and the internal resistance of said generator, such components being connected so that their resistances form a balanced Wheatstone bridge; a source of current of a second character, a first circuit capable of conducting only said current of a second character and connecting said source of current across first opposite junction points of the arms of said bridge, a code following relay having a control winding, a second circuit capable of conducting only said current of a second character and connecting the control winding of said relay across second opposite junction points of the arms of said bridge, a third circuit capable of conducting only said current of a second character and connected to intermittently shunt at a selected code rate one arm of said bridge; and means controlled by said relay for indicating, when the relay is following code at said selected code rate, that said supply circuit is intact.

7. Apparatus for checking that a supply circuit for supplying the output from a direct current generator across a control winding is intact, said circuit and apparatus comprising; first and second resistive elements so selected that the product of the resistance of the first resistive element and the resistance of said control winding equals the product of the resistance of the second resistive element and the internal resistance of said generator, such components being connected so that their resistances form a balanced Wheatstone bridge; an alternating current source connected, through a capacitor, across first opposite junction points of the arms of said bridge; an alternating current relay connected, through a capacitor, across second opposite junction points of the arms of said bridge; a shunting circuit capable of conducting alternating current only and intermittently closed around one arm of said bridge at a selected code rate; and means, responsive only to the intermittent operation at said selected code rate of a contact of said relay, for indicating that said supply circuit is intact.

8. In combination, a balanced Wheatstone bridge circuit comprising, a generator of current of a first character, a control winding to be controlled by and responsive only to said current, and first and second resistors so selected that the product of the resistance of the first resistor and the resistance of said winding equals the product of the resistance of the second resistor and the internal resistance of said generator; a source of current of a second character, a code following relay having a control winding responsive to said current of a second character; first, second and third circuits each capable of conducting only said current of a second character, said first circuit connecting said source of current across first opposite junction points of the arms of said bridge circuit, said second circuit connecting said relay winding across second opposite junction points of the arms of said bridge circuit, and said third circuit intermittently unbalancing said bridge circuit at a selected code rate; and means responsive to the intermittent operation of said relay at said selected code rate for indicating that the components of said bridge circuit are intact.

9. In a control apparatus for a vehicle having a source of motive power and brakes comprising, a controller for controlling the speed of said vehicle in accordance with each of a plurality of positions to which the controller is moved; a device having first and second windings for producing a mechanical output in accordance with the difference in values and directions of first and second potentials of current of a first character supplied to said first and second windings, respectively, said output being supplied to said controller; means for providing to said first winding a potential of current of said first character selected in accordance with a desired vehicle speed, a generator producing at its output terminals a potential of current of said first character representative of the actual speed of said vehicle; first and second resistors so selected that the product of the resistance of the first resistor and the resistance of said second winding equals the product of the resistance of the second resistor and the internal resistance of said generator across its output terminals, said resistors, said second winding and said generator being so connected that the resistances thereof form a balanced Wheatstone bridge circuit; a source of current of a second character, a code following relay having a control winding responsive to said current of a second character; first, second and third circuits each capable of conducting only said current of a second character, said first circuit connecting said source of current of a second character across first opposite junction points of the arms of said bridge circuit, said second circuit connecting said relay winding across second opposite junction points of the arms of said bridge circuit, and said third circuit intermittently unbalancing said bridge circuit at a selected code rate; and means controlled by said relay for releasing the brakes of and supplying motive power to said vehicle when the relay is operating at said selected code rate.

References Cited by the Examiner

UNITED STATES PATENTS

| | | | |
|---|---|---|---|
| 2,436,224 | 2/48 | Ogle | 317—123 |
| 2,492,472 | 12/49 | Fortescue | 317—153 |
| 2,570,156 | 10/51 | Reiss | 317—153 |
| 2,716,186 | 8/55 | Ford | 246—182.1 |
| 2,719,912 | 10/55 | Maenpaa et al. | 246—182 |
| 2,768,331 | 10/56 | Cetrone | 317—5 |
| 2,838,657 | 6/58 | Wilcox | 246—182 |
| 2,841,745 | 7/58 | Shields | 317—5 |
| 2,906,928 | 9/59 | Klein | 317—153 |
| 2,931,957 | 4/60 | Paar | 317—153 |
| 3,041,449 | 6/62 | Singen | 246—182 |
| 3,071,713 | 1/63 | Duncan | 317—159 |

EUGENE G. BOTZ, *Primary Examiner.*

LEON LEONNIG, JAMES SHANK, *Examiners.*